(12) United States Patent
Taylor et al.

(10) Patent No.: US 8,197,902 B2
(45) Date of Patent: Jun. 12, 2012

(54) LOW VOC COATING COMPOSITION

(75) Inventors: Philip Louis Taylor, Heathlands (GB); Denis Malcolm Harvey Bovey, Slough (GB); Stephen Barry Downing, High Wycombe (GB); Krisztina Erdelyi-Brooks, Windsor (GB)

(73) Assignee: Imperial Chemical Industries PLC, London (GB)

( * ) Notice: Subject to any disclaimer, the term of this patent is extended or adjusted under 35 U.S.C. 154(b) by 682 days.

(21) Appl. No.: 11/815,093

(22) PCT Filed: Jan. 10, 2006

(86) PCT No.: PCT/EP2006/000233
§ 371 (c)(1),
(2), (4) Date: Dec. 2, 2009

(87) PCT Pub. No.: WO2006/079453
PCT Pub. Date: Aug. 3, 2006

(65) Prior Publication Data
US 2010/0068397 A1    Mar. 18, 2010

(30) Foreign Application Priority Data
Jan. 31, 2005  (GB) .................................. 0501854.4

(51) Int. Cl.
*B05D 5/06*   (2006.01)

(52) U.S. Cl. ..................................... 427/384; 427/385.5
(58) Field of Classification Search .................. None
See application file for complete search history.

(56) References Cited

U.S. PATENT DOCUMENTS

| | | | | | |
|---|---|---|---|---|---|
| 4,190,693 | A | * | 2/1980 | Martorano et al. | 428/209 |
| 5,554,671 | A | * | 9/1996 | Craun et al. | 523/408 |
| 5,859,112 | A | * | 1/1999 | Overbeek et al. | 524/460 |
| 5,962,571 | A | * | 10/1999 | Overbeek et al. | 524/460 |
| 6,303,189 | B1 | * | 10/2001 | Gray et al. | 427/385.5 |
| 2003/0191236 | A1 | * | 10/2003 | Buckmann et al. | 524/591 |
| 2005/0182180 | A1 | * | 8/2005 | Martin et al. | 524/501 |

FOREIGN PATENT DOCUMENTS

WO     WO 03/082999     * 10/2003

* cited by examiner

*Primary Examiner* — Erma Cameron
(74) *Attorney, Agent, or Firm* — George W. Moxon, II; Brian P. Harrod

(57) ABSTRACT

A pigmented, aqueous coating composition comprising i) an aqueous dispersion of non-crosslinkable addition oligomer of weight average molecular weight of from 5000 to 15000 Daltons and calculated Fox Tg greater than 0° C. and less than 50° C. ii) an aqueous dispersion of addition polymer of weight average molecular weight greater than 53,000 Daltons, calculated Fox Tg greater than 10° C. and less than 40° C. and mean particle diameter of less than 150 nanometers, where the ratio of i):ii) is from 0.25:1 to 2.70:1, based on % weight dispersion solids.

17 Claims, No Drawings

LOW VOC COATING COMPOSITION

CROSS-REFERENCE TO RELATED APPLICATION

This application is the national phase under 35 U.S.C. §371 of PCT International Application No. PCT/EP 2006/1000233 having an International Filing Date of Jan. 10, 2006 entitled "IMPROVED LOW VOC COATING COMPOSITION", which designated the United States of America, and was published in the English language as International Publication No. WO 2006/079453, and claims the benefit of priority to Great British Application No. 0501854.4 filed Jan. 31, 2005. The disclosure of all of these applications is hereby incorporated in their entirety by reference.

The present invention relates to aqueous coating compositions which have low volatile organic solvent content (VOC). The invention is particularly concerned with pigmented aqueous architectural coating compositions which are of high gloss and which retain their gloss when dry. The term "architectural coating" is used in this context to mean coatings for painting the interior and exterior surfaces of structures such as buildings, fences and bridges. For simplicity such coatings will be referred to collectively as paints. The invention also relates to certain waterborne oligomers and polymeric dispersions.

Coating compositions typically comprise a carrier liquid and a film forming binder polymer together with other components such as additives including thickeners and for coloured paints, of course, pigments. The carrier liquid can comprise water, organic solvent or a mixture of water and organic solvent. The binder polymer may be in the form of a dispersion of particles in the carrier liquid, whereby the polymer exists in particulate form or it may be dissolved in the carrier liquid and be a solution.

High gloss coatings are paints which when dried to a solid layer have a gloss value of at least 75% (gloss values herein are measured at 20° unless otherwise indicated). Such paints are known and are usually based on polymers dissolved in organic solvent, also referred to as solution polymers. Typical high gloss paints are based on alkyd polymers dissolved in an organic liquid, usually white spirit. Of course, such paints have high VOC and release large amounts of organic solvent into the atmosphere during the painting process and subsequent drying of the liquid paint, giving rise to unpleasant odours and environmental hazards. This is a particular problem for architectural paints when used to paint the interior of buildings, especially in confined spaces and unventilated rooms. Furthermore, alkyd based paints contain metal driers to speed up autoxidation. The most commonly used metal drier, a cobalt compound, is now considered to be environmentally hazardous.

Paints, especially those suitable for application to architectural surfaces such as buildings, are admired largely because of the smooth and even surface that results when the liquid paint dries to a solid layer. Such a surface is relatively easy to achieve in low gloss paints such as silk (gloss about 30-45% at 60°), eggshell (gloss about 15-25% at 60°) and matt paints (gloss <10% at 85°), because when dry, the surface of such a paint, being low gloss, reflects only a small amount of light. Consequently, the eye finds it more difficult to detect defects. For high gloss paints, which have surfaces that are more reflective, defects, such as roughness and/or unevenness, are much easier to see. Thus it is more difficult to produce a high gloss paint than a low gloss paint which appears defect free; in particular to appear smooth and even.

The dried paint can exhibit various surface defects, mainly arising during the time when the paint is still wet or at least in the early stages of drying. These include cisses and craters which are usually produced by small areas of contamination, such as dirt or oils, on the substrate being painted or on the wet paint itself, causing the liquid paint either to dewet on the substrate or to flow away from a contaminant on the paint surface. These defects are usually overcome by improving substrate preparation and general cleanliness in the painting area. Such defects however are not the principal concern of this invention.

Uneven paint surfaces are also produced by the action of the paint brush used to apply the paint. This arises when a first portion of high gloss paint is applied to a substrate by brush, especially over a large area, such as a door. In this situation the first portion of paint will have partly dried before the painter returns to paint the adjacent unpainted area. The larger the area to be painted the longer the interval and consequently the greater the extent of drying of the first portion. Inevitably, the painter will have to apply fresh paint over the partially dried first portion of paint, especially at its perimeter, also known as the overlap area. The partially dried paint in this area will be of higher viscosity than the fresh paint. The painter now faces a problem of merging or 'blending-in' the fresh paint with the partially dried, more viscous paint so that the surface appears level especially in the overlap area.

As the painter applies the fresh paint over the partially dried paint using the brush, the action of the bristles of the brush disturb the partially dried paint beneath, which being of high viscosity will not flow out to leave the desired smooth surface. Although the fresh paint, because of its lower viscosity, will flow, it only mirrors the now disturbed and rough surface beneath. Alternatively, the viscosity of the fresh paint applied over the overlap area may increase very quickly as the liquid carrier diffuses from it and into the paint beneath thus making it impossible to achieve an even finish. In any case, for a given paint, there is a maximum amount of time a painter can allow before returning to paint over the overlap area whilst achieving an acceptably even finish and this is known as the open-time or lap-time.

Clearly a long open-time is preferred as the painter has more time before he has to return to merge or 'blend in' the fresh paint with the prior applied paint. For known high gloss paints based on solution polymers, open-times tend to be about 20 minutes. However, such paints have the disadvantage of producing high organic solvent emissions, which not only have unpleasant smells but are also considered to be injurious to health, particularly when used over long periods. Tack-free times of such paints, as measured by the sand dry time are also long at about 4 hours. The sand dry test is a measure of the time beyond which the paint no longer feels sticky to the touch. Short tack free times are preferred.

In addition, these known high gloss paints based on alkyd polymers rely on crosslinking by autoxidation to complete the hardening process and produce the final solid coating. This is a slow process involving the diffusion of oxygen from the atmosphere into the liquid paint film. Consequently, the paint once applied to a substrate cannot be recoated for some 16 hours. This is because the solvent in the second coat of paint partially dissolves the first coat causing it to swell and bubble. Furthermore, such alkyd based paints also become increasingly yellow as they age, especially in dimly lit areas. This is particularly problematic in white and pastel colours.

Low VOC paints based on dispersions of alkyd polymers in aqueous carrier liquid are also known. These have the same disadvantages as the solventborne alkyd paints.

Waterborne, low VOC paints, based on high molecular weight dispersion polymers are also known. However, even the glossiest of these have low gloss of about 60 to 65% (measured at 20°) and have unacceptably short-open times of only 3 to 4 minutes. The short open-times arise because the polymers of such paints are particulate. Consequently, as the paint dries on a surface and the aqueous medium begins to evaporate, the volume fraction of the polymer rises, with an associated but small increase in viscosity. As evaporation continues, the volume fraction continues to increase reaching a point where the dispersed particles touch one another. When this happens the viscosity of the drying paint increases greatly over small increases in solids to the extent that it becomes impossible to blend in the fresh paint with the earlier applied paint.

In high gloss paints based on polymers dissolved in carrier liquid, the viscosity rise on drying is much less rapid as there are no polymer particles. It is for this reason that open times are typically much longer in paints based on solution polymers.

Waterborne, high gloss paints for architectural use are also known. U.S. Pat. No. 5,422,394 describes one such paint based on autoxidisable acrylic solution polymer, the autoxidative capability being provided by allyl groups. These have good lap times of about 15 minutes and high gloss of 80 to 85%. However, the water resistance of these paints is unacceptably poor, especially in the first few days following application. This is because it takes time for autoxidation to form sufficient crosslinks to raise the molecular weight of the acrylic polymer to convert it into an insoluble polymer which will be unaffected by water. Additionally, the allyl moiety is not very robust regarding the speed of crosslinking.

More recently, international patent application WO 03/082999 discloses waterborne paint formulations comprising a mixture of non-crosslinkable low molecular weight oligomer and high molecular weight dispersed polymer. The object is to provide coating compositions of improved open times, by which is meant greater than 20 minutes. Oligomers of various types are disclosed including vinyl, polyester, polyurethane and hyperbranched oligomers. High molecular weight dispersion polymers are also disclosed.

We have now discovered deficiencies with the coating compositions based on the dispersion polymers and non-crosslinkable vinyl oligomers of WO 03/082999. The main deficiency is that the gloss of such compositions when pigmented, for example Paint Example 4 as disclosed in WO 03/082999, is below 75% which is unacceptable to those consumers who prefer the highly reflective surface of high gloss paint. This is thought to be due to the incompatibility of the polymer and oligomer used in the example. Furthermore, although Paint Example 4 provides open times of greater than 20 minutes, the paint film remains tacky for extended periods of time and is soft even when fully dried.

So although open times of 20 minutes and more are achievable using the teaching of WO 03/082999, the low gloss and soft, tacky final films that result are very serious deficiencies. This is particularly so in the field of architectural paints where the paints are applied and must develop their final properties at ambient temperatures. In fact the deficiencies are so significant that the paints are not suitable for use as decorative and/or protective coatings. These problems are not addressed by WO 03/082999. Nevertheless, there remains an unmet need for high gloss, low VOC waterborne paints that dry quickly and have adequate hardness, especially in the field of architectural paints.

Furthermore, we have now established that, unexpectedly, it is not necessary to match the lap times of existing solvent-borne high gloss paints, such as those based on alkyds. In fact, with low VOC waterborne high gloss paints of this invention, lap times of from 6±1 to 12±3 minutes and never more than 15 minutes, measured by the method described hereunder, are acceptable. These have advantages over lap times of at least 20 minutes found in low VOC waterborne formulations described in WO 03/082999, as a better balance of final dried paint properties is achieved. In particular, lap times of 6±1 to 12±3 minutes allow a smooth, even and hard surface to be achieved whilst keeping the tack free time, as measured by the sand-dry test described hereunder, to less than about 200 minutes.

The disclosure of WO 03/082999 reveals only one embodiment, known as Paint Example 4 in that document, of a vinyl oligomer based paint and it is silent on how to select the oligomer and the dispersed polymer in order to achieve high gloss, and short tack free times and a hard dried coating.

We have now produced an improved waterborne paint which overcomes the severe deficiencies of the prior art waterborne paints and which has excellent overall properties.

Accordingly there is provided a pigmented, aqueous coating composition comprising
i) an aqueous dispersion of non-crosslinkable addition oligomer of weight average molecular weight of from 5000 to 15000 Daltons and calculated Fox Tg greater than 0° C. and less than 50° C.,
ii) an aqueous dispersion of addition polymer of weight average molecular weight greater than 53,000 Daltons, calculated Fox Tg greater than 10° C. and less than 40° C. and mean particle diameter of less than 150 nanometers,
where the ratio of i):ii) is from 0.25:1 to 2.70:1, based on % weight dispersion solids.

Preferably, the coating composition has an open time of from 6±1 to 12±3 minutes and never more than 15 minutes, and when dry has a measured gloss of at least 75%. This allows a smooth, high gloss paint surface to be achieved without requiring great skill or speed by the painter. More preferably, the gloss is from 6±1 to 12±3 minutes and even more preferably from 6±1 to 10±3 minutes.

It is advantageous for the dry coating composition to have further properties of sand-dry time less than or equal to 200 minutes and a hardness of at least 30 seconds.

Preferably the hardness of the dried paint, as measured by the method described hereunder is from 30 to 200 seconds even more preferably from 35 to 150 seconds and most preferably from 40 to 150 seconds. A hardness value above 30 seconds means that the dried paint is hard enough to withstand handling without feeling soft or being damaged.

Preferably the sand-dry time of the coating composition is less than 200 minutes, more preferably less than 170 minutes and most preferably from 50-170 minutes. Short sand-dry times are preferred as the paint is less likely to be damaged by, for example, accidental contact with a person or object, or indeed dust from the atmosphere landing on the paint.

Suitable pigments include organic pigments such as phthalocyanines, azos, quinacridones; and inorganic pigments such as carbon blacks, iron oxides and titanium dioxide. The mean particle diameters of the pigment particles may be up to 20 microns more preferably up to 10 microns. Particle diameters above 20 microns can reduce the gloss of the dried paint.

The coating composition may also contain ingredients selected from the group consisting pigments, fillers, waxes, extenders, rheological modifiers, dispersants, flow aids and biocides.

The open time is preferably at least 7 minutes and less than 10 minutes, even more preferably it is from 8 to 10 minutes.

Paints with open times longer than about 10 minutes tend to have impracticably long tack-free times and are thus unacceptable to users.

Preferably the gloss is from 75 to 100%, more preferably from 78% to 100% and most preferably from 80 to 100%.

By aqueous is meant that the carrier liquid is at least 50% by weight water, the remainder being organic solvent. Preferably the organic solvent is compatible with the water and even more preferably it is soluble in the water in the amounts used as this tends to produce improved stability, especially viscosity stability, when stored for extended periods of time. Examples of suitable organic solvents include alcohols, glycols, ester alcohols, ether alcohols and the esters of ether alcohols, for example n-butanol, propylene glycol, benzyl alcohol, 2,2,4 trimethylpentane 1,3 diomonoisobutyrate, propylene glycol monomethyl, monoethyl, monopropyl and monobutyl ether, diethylene glycol, dipropylene glycol, dipropylene glycol methyl ether, diethylene glycol ethyl ether and 1-methoxy-2-hydroxy propane.

Preferred solvents include methyl di-propoxal and Texanol, an ester alcohol, as they both aid coalescence of the polymer and oligomer particles, particularly the polymer particles.

It is beneficial to the user and the environment to minimise the amount of organic solvent and hence the VOC in the paint. Preferably the organic solvent content of the carrier liquid is from 0 to 49.9%, more preferably from 0 to 25%, even more preferably from 0 to 15% and most preferably from 0 to 10%.

By aqueous dispersion is meant that the polymer and oligomer exist as particles in the aqueous phase.

The ratio of the oligomer to polymer calculated on a % weight dispersion solids basis is from 0.25:1 to 2.70:1, more preferably from 0.30:1 to 2.70:1, yet more preferably from 0.43:1 to 2.33:1 and most preferably from 0.8:1 to 1.30:1 Below a ratio of 0.25:1 the open time becomes unacceptably short, whereas above a ratio of 2.70:1 the gloss decreases rapidly.

By addition polymer and addition oligomer is meant that both the polymer and oligomer are derived from free radically polymerisable ethylenically unsaturated monomers. Examples of suitable such ethylenically unsaturated monomers include (meth)acrylic acid esters, amides, and nitriles, vinyl monomers and vinyl esters.

Chain transfer agents, such as the mercaptans, can be used to control the molecular weight of the polymer and oligomer. Suitable mercaptans include n-octyl mercaptan, n-dodecyl mercaptan, n-hexadecyl mercaptan and t-dodecyl mercaptan.

Using the nomenclature of (meth)acrylate to represent both acrylate and methacrylate, examples of suitable acrylic acid esters and methacrylic acid esters are alkyl esters, preferably methyl (meth)acrylate, propyl (meth)acrylate, butyl (meth)acrylate, 2-ethyl hexyl (meth)acrylate and alkoxy poly(oxyethylene) (meth)acrylate. Small amounts of acidic monomers such as methacrylic acid, acrylic acid, succinic anhydride and maleic anhydride may also be used alone or in combination. Hydroxy functional monomers such as hydroxy ethyl (meth)acrylate and hydroxy isopropyl (meth)acrylate may be included also, although care must be taken when making oligomer containing such monomers as reactor fouling and instability can result.

Examples of suitable vinyl monomers include styrene and alpha methyl styrene, vinyl propionate, vinyl butyrate, vinyl acetate and vinyl versatate. Preferably the addition polymer and oligomer are derived from the esters of acrylic acid, methacrylic acid and optionally styrene and/or its derivatives.

Even more preferably, the oligomer contains methacrylic acid and/or acrylic acid and most preferably it contains methacrylic acid as acrylic acid tends to produce water soluble oligomer which reduces the water resistance of the dried paint. The preferred amount of acid is from 4 to 8% by weight of the total oligomer monomers, which is equivalent to an acid value (AV) of about 25 to 55 mg KOH/g non vol oligomer. Even more preferably the AV is from 30 to 45 mg KOH/g and most preferably it is from 35 to 45 mg KOH/g. At AV greater than about 55 the water sensitivity of the paint is unacceptably poor and below about 25 the gloss of the paint is poor.

The acid is preferably at least partially neutralised with neutralising base. Suitable bases include the alkali metal hydroxides such as sodium hydroxide or potassium hydroxide. More preferably, organic bases are used such as dimethyl amino ethanol, triethylamine and ammonia. Optionally, the neutralisation may be carried out at elevated temperature as this results in improved viscosity stability and a smoother final dried paint than when cold neutralised.

Paints based on oligomers containing methoxy (polyethylene glycol)$_n$ methacrylate, [abbreviated to MeO(PEG)$_n$MA], where n is the molecular weight of the polyethylene glycol portion and is typically from 350 to 2000 Daltons, tend to be of unacceptably low gloss. Preferably, the oligomer comprises less than 5% by weight of MeOPEGMA and most preferably it is MeOPEGMA free.

The glass transition temperature, or Tg, of the addition polymer may be varied by copolymerising monomers of appropriate Tg. Preferably the addition polymer has a calculated Fox Tg of between 20 and 40° C., more preferably from 25 to 35° C. At Tg 10° C. and below, the paint has unacceptably long tack-free time and also inadequate water resistance, whilst a Tg of about 40° C. and above results in an unacceptably rough surface finish when the fully dried first coat is recoated with a second coat of the paint.

The addition polymer preferably has a measured weight average molecular weight of from about 53000 to 1000000 Daltons, more preferably from 53000 to 500000 Daltons, even more preferably from 53000 to 250000 Daltons and most preferably from 53000 to 220000 Daltons. Below 53000 Daltons, the resulting paint is unacceptably poor for block resistance.

Polymer molecular weights above about 1000000 are difficult to measure accurately as it is often difficult to find solvents able to dissolve polymers of such high molecular weight. Often, the insoluble, highest molecular weight fraction of the polymer is filtered out before being measured leading to artificially low molecular weights being measured.

The mean particle diameter of the addition polymer dispersion is preferably from 10 to 150 nanometers, more preferably from 50 to 135 and most preferably from 80 to 125. Above 150 nanometers the gloss falls below 75%.

The non-crosslinkable addition oligomer preferably has a weight average molecular weight of from 7500 to 12500 Daltons, more preferably from 8500 to 11500 Daltons and most preferably from 9000 to 11000 Daltons. Above about 15000 Daltons, the gloss of the paint falls below 75%. Below about 5000 Daltons, the oligomer tends to remain tacky, irrespective of the calculated Fox Tg. Although not wishing to be bound by this, it is thought that this is because as the molecular weight decreases the true molecular weight of the oligomer is significantly lower than the Fox Tg. Furthermore, in order to achieve such a low molecular weight, the amount of the mercaptan chain transfer agent remaining from the polymerisation step is sufficient to create malodours in the paint. This makes it very unattractive to users, especially when the paint is to be applied in the interior of a building or any other poorly ventilated space.

The calculated Fox Tg of the oligomer should be greater than 0° C. and less than 50° C., preferably from 10 to 40° C., more preferably from 10 to 30° C. and most preferably from 15 to 25° C. At Tg of 0° C. the paint has an unacceptably long tack-free time and at 50° C. and above the gloss is unacceptably low.

The addition polymer dispersion may be prepared by known polymerisation processes. Preferably, known emulsion polymerisation process using a water soluble polymerisation initiator and typically an ionic and/or a non-ionic surfactant. More preferably a seed and feed process is used. This requires a first, small portion of the monomers typically comprising about 5% of the total monomers, (usually known as the seed monomers) to be polymerised over a short period of some 15 minutes. This is followed by polymerisation of the remaining monomers (the feed monomers) which may be of different monomer composition to the seed. The feed monomers are generally polymerised over a much longer time. Optionally, the monomers may be emulsified in water in the presence of a surfactant to produce an emulsion of monomers dispersed in water prior to addition to the reaction vessel.

Suitable examples of water soluble polymerisation initiators include ammonium persulphate, sodium persulphate, potassium persulphate, the peroxides including hydrogen peroxide, t-butyl hydroperoxide. Redox initiator systems may also be used. Suitable examples include hydrogen peroxide and ascorbic acid, t-butyl hydroperoxide and sodium ascorbate, ammonium persulphate and sodium metabisulphite or sodium sulphoxylate formaldehyde. Optionally, metal salts such as copper or iron may be added.

Polymerisation is effected by raising the temperature of the reaction vessel above that of the decomposition temperature of the initiator. Temperatures of from 30 to 98° C. are preferred. When a redox initiator system is used, especially in the presence of a suitable metal, the lower temperatures are favoured. Where polymerisation is effected by thermal decomposition of the polymerisation initiator, higher temperatures of the range are preferred.

The process and ingredients used to make the addition polymer are also suitable for the manufacture of the oligomer. However, in the case of the oligomer it is preferable that the monomers to be polymerised are formed into an emulsion prior to polymerisation. This is usually performed in a separate vessel to the polymerisation reactor. Intensive agitation is required, which can be provided by a mechanical emulsifier such as a Silverson (available from Silverson Machines Ltd, Chesham) or alternatively, a Sonolator (available from Sonic Corp, Connecticut, USA) may be used, which employs ultrasound to generate the necessary high shear. Optionally, a small quantity of a hydrophobic material, such as hexadecane or soya bean oil, may be added to the monomers prior to emulsification. The presence of such material improves the stability of the monomer emulsion. This results in less reactor fouling during polymerisation of the oligomer.

In a second aspect the invention provides a method of making the addition oligomer of claim 1 comprising the steps of making a monomer in water emulsion by
  i) mixing the monomers, water and surfactant and optionally hydrophobic material to form a mixture
  ii) exposing the mixture of i) to high shear using intensive agitation means to form a monomer in water emulsion and causing the monomers to polymerise and form the addition oligomer dispersion.

Preferably, the mixture of i) contains hydrophobic material as this produces a more stable oligomer dispersion.

In a third aspect the invention provides a use of the polymer and oligomer as defined in claim 1 to produce a coating composition which has an open time of from 6±1 to 12±3 minutes and never more than 15 minutes; and when dry, has a gloss of 75%. Preferably, the open time is from 6±1 to 12±3 minutes and most preferably from 6±1 to 10±3 minutes.

In a fourth aspect the invention provides a process of applying to a substrate a coating of the invention and causing or allowing said coating to dry to form a solid layer with a gloss of at least 75%.

EXAMPLES

The invention will now be illustrated by the following examples.

The following ingredients were used in the preparation of the examples.

Rhodafac RK500 and RS710 are available from Rhodia Geronazzo S.p.A, Milan, Italy.
Rocima V189 is available from Thor UK Ltd.
t-butyl hydroperoxide is available from Elf Atochem UK Ltd.
Sodium formaldehyde sulphoxylate is available from Bruggeman Chemicals.
AMPS 2405 is available from Lubrizol UK Ltd.
Soya bean oil is available from Seators Ltd, UK.
Emulsogen EPA 1954 is available from Clariant, UK.
Orotan 681 and Acrysol RM 2020 are available from Rohm and Haas (UK) Ltd
Tego foamex 1488 is available from Tego Chemicals.
Empimin OT75 is available from Albright and Wilson, UK
Tioxide TR 52 is available from Huntsman Corporation Europe.

Preparation of an Aqueous Dispersion of Polymer

Example Pol 1

A 2l flat bottomed flask was fitted with a stirrer, nitrogen purge, water condenser and suitable ports for metering additions. An aqueous charge of 550.90 g of demineralised water was added to the flask followed by 27.91 g of seed surfactant solution (consisting of 5.39 g of Rhodafac RS710, 21.57 g of demineralised water and 0.95 g of ammonia solution). The temperature of the contents was raised to 80° C. using the water bath. When the contents reached 80° C. 13.96 g of seed monomer mixture (consisting of 4.47 g of styrene, 4.38 g methyl methacrylate, 4.61 g butyl acrylate and 0.50 g methacrylic acid) was added to the flask. The temperature was maintained at 80° C. for 10 minutes when 19.62 g of the seed initiator solution (consisting of 0.82 g of sodium persulphate dissolved in 18.80 g of demineralised water) was added. After 10 minutes the temperature was raised to 85° C. over 15 minutes. When the set temperature had been reached, 544.39 g of the feed monomer mixture (consisting of 174.20 g styrene, 170.94 g methyl methacrylate, 179.65 g butyl acrylate and 19.6 g methacrylic acid) was fed in over 3 hours at a constant rate. 41.86 g of surfactant solution (consisting of 8.09 g Rhodafac RS710, 32.35 g demineralised water and 1.42 g ammonia) was added concurrently to the monomer feed at a constant rate. At the same time, was added 78.47 g of the feed initiator solution (3.28 g sodium persulphate dissolved in 75.19 g of demineralised water) but over 3.5 hours. When this addition was complete, the temperature of the dispersion was reduced to 60° C. after which 4.68 g of a mop-up charge (consisting of 0.78 g sodium t-butyl hydroperoxide dissolved in 3.90 g of demineralised water) was added. After 5 minutes 9.97 g of a further mop-up charge (consisting of 0.78 g sodium formaldehyde sulphoxylate dissolved in 8.19 g of demineralised water) was added over 15 minutes. The temperature was maintained at 60° C. for a further 15 minutes at the end of the addition after which 6.76 g of ammonia (35% by vol) was added. The dispersion was then cooled to 30° C. and a biocide (Rocima V189) was added to protect it from microbiological growths.

Tg=30° C.

Mean particle diameter was 107 nanometers

The weight average molecular weight (Mw) was 156000 Daltons.

Examples Pol 2-4

Effect of Molecular Weight

These Examples were made according to the same process and the same ingredients as for Example Pol 1, other than that the monomer mixture used, on a weight % basis, was as described below. The chain transfer agent, n-octyl mercaptan was used to modify the molecular weight.

| Example | St | MMA | BA | MAA | POM | Mw |
|---|---|---|---|---|---|---|
| Pol 2 | 40 | 19.8 | 34.3 | 5.8 | 0.1 | 122000 |
| Pol 3 | 39.8 | 19.7 | 34.2 | 5.8 | 0.5 | 53000 |
| Pol 4 | 39.6 | 19.6 | 34.2 | 5.8 | 1.0 | 31000 |

St = styrene
MMA = methyl methacrylate
BA = butyl acrylate
MAA = methacrylic acid
POM = n-octyl mercaptan The weight average molecular weight was measured according to the method described below.

Examples Pol 2-4 all had Tg=30° C. and mean particle diameters of 100-120 nanometers.

Examples Pol 5-7

Effect of Tg

These examples were made according to the same process and the same ingredients as Example Pol 1, other than that the monomer mixture used, on a weight % basis, was as described below.

| Example | St | MMA | BA | MAA | Tg |
|---|---|---|---|---|---|
| Pol 5 | 35.0 | 15.7 | 45.7 | 3.6 | 10° C. |
| Pol 6 | 35.0 | 22.0 | 39.4 | 3.6 | 20° C. |
| Pol 7 | 35.0 | 33.0 | 28.4 | 3.6 | 40° C. |

Examples Pol 5-7 all had Mw of 149000-195000 Daltons and mean particle diameter of 100-120 nanometers.

Examples Pol 8 and 9

Effect of Mean Particle Diameter

The particle size of the polymer dispersion was varied by changing the surfactant and the seed monomer to feed monomer ratio. A different surfactant was used, namely Rhodafac RK500 instead of the Rhodafac RS710 used in Pol 1.

Both variants had the following monomer composition calculated on a weight % basis;

| St | MMA | BA | MAA |
|---|---|---|---|
| 35.0 | 27.6 | 33.8 | 3.6 |

The Tg was 30° C.

Example Pol 8

A 2 liter reaction vessel was fitted with a stirrer, nitrogen purge, water condenser and suitable ports for metering additions. An aqueous charge of 662.7 g of demineralised water was added to the vessel followed by 2.1 g of seed surfactant Rhodafac RK500 and buffer solution (consisting of 1.68 g sodium phosphate heptahydrate and 12.6 g demineralised water). The temperature of the contents was raised to 75° C. using a water bath. When the contents reached 75° C. 30.1 g seed monomer mixture (consisting of 10.5 g of styrene, 8.3 g methyl methacrylate, 10.2 g butyl acrylate and 1.1 g methacrylic acid) was added to the vessel. The temperature was maintained at 75° C. for 10 minutes when 8 g initiator solution (consisting of 2.1 g ammonium persulphate and 5.9 g demineralised water) was added. The mixture was held at 75° C. for 15 minutes then 571.9 g of the feed monomer mixture (consisting of 200.2 g of styrene, 157.8 g methyl methacrylate, 193.3 g butyl acrylate and 20.6 g methacrylic acid) and 63.8 g surfactant solution (consisting of 14.42 g AMPS 2405 [sodium 2-acrylamido-2-methylpropane sulphonate], 9.38 g Rhodafac RK500 and 40 g demineralised water) were fed in simultaneously over 3 hours. When these additions were complete the temperature of the dispersion was held at 75° C. for 10 minutes and a 10.1 g mop-up charge (consisting of 0.3 g Sodium formaldehyde sulfoxylate and 9.8 g demineralised water) was added. After 10 minutes hold a further 10.2 g mop-up charge (consisting of 0.4 g t-butyl hydroperoxide and 9.8 g demineralised water) was added. After an additional 10 minutes hold a final 10.1 g mop-up charge (consisting of 0.3 g Sodium formaldehyde sulfoxylate and 9.8 g demineralised water) was added. The temperature was maintained at 75° C. for 15 minutes following which the dispersion was cooled back to 30° C. and 7 g concentrated ammonia solution (35% concentration) was added followed by a biocide (Rocima Product V189, 1.54 g dissolved in demineralised water) to protect it from microbiological growths.

The mean particle diameter was 252 nanometers.

Example Pol 9

A second particle size variant (R10934/53, PS=179 nm) was made according to the process and recipe of Pol 8 except that 60.2 g of seed monomer charge was used and 541.8 g of monomer feed.

The mean particle diameter was 179 nanometers.

Preparation of an Aqueous Dispersion of Oligomer

Example Olig 1

A 2 l flat bottomed flask was fitted with a stirrer, nitrogen purge, water condenser and suitable ports for metering additions. An aqueous charge of 297.72 g of water was added to the flask followed by 3.88 g of Emulsogen EPA 1954 and heated to 50° C. using a water bath. During the heat-up period, a monomer feed emulsion was prepared by adding 239.00 g of butyl acrylate, 310.70 g of methyl methacrylate, 35.07 g methacrylic acid, 17.98 of n-octyl mercaptan and 11.74 g of soya bean oil to 432.54 g of water in which was dissolved 51.41 g of Emulsogen EPA 1954 surfactant. The mixture was emulsified using a Silverson emulsifier for about 8 minutes. When the aqueous charge had reached 50° C., an initiator charge (of 2.41 g of t-butyl hydroperoxide) was added to the flask and after 10 minutes the monomer feed emulsion was added at a uniform rate over 3 hours. A separate activator feed (consisting of 0.70 g of sodium ascorbate in 68.95 water) was added concurrently. The temperature was maintained at 50° C. throughout the feeds. When the feeds were complete, the resulting oligomer dispersion was held at 50° C. for a further 15 minutes following which an activator shot (consisting of 0.23 g sodium ascorbate in 23.17 g of water). After a further 1 hour at 50° C., the oligomer dispersion was cooled to 35° C. and a biocide solution (consisting of 1.50 g Rocima V189 dissolved in 3.00 g water) was added. The dispersion was filtered before use.

Tg=20° C.

Mean particle diameter was 110 nanometers

The weight average molecular weight was 10500 Daltons.

Examples Olig 2-5

Effect of Molecular Weight

Examples Olig 2-6 were made according to the same process and recipe as used for Olig 1 other than the amount of n-octyl mercaptan (in grams) was varied as indicated below to adjust the molecular weight.

|  | POM | Molecular weight |
|---|---|---|
| Olig 2 | 30.00 | 6300 |
| Olig 3 | 13.58 | 13600 |
| Olig 4 | 9.12 | 19700 |
| Olig 5 | 4.53 | 42000 |

The mean particle diameter of Examples Olig 1-5 was from 105 to 115 nanometers.

All had a Fox Tg of 20° C.

Examples Olig 6-10

Effect of Tg

Examples Olig 6-9 were made according to the same process and recipe as used for Olig 1. The relative amount of the acrylic monomers used in the monomer feed emulsion, on a weight % basis, was varied as described below, in order to adjust the Tg.

|  | MMA | BA | MAA | Tg |
|---|---|---|---|---|
| Olig 6 | 40.9 | 53.1 | 6.0 | 0° C. |
| Olig 7 | 47.0 | 47.0 | 6.0 | 10° C. |
| Olig 8 | 58.9 | 35.1 | 6.0 | 30° C. |
| Olig 9 | 64.2 | 29.8 | 6.0 | 40° C. |
| Olig 10 | 69.3 | 24.7 | 6.0 | 50° C. |

The weight average molecular weight of Examples Olig 6-9 were from 10000 to 11500 Daltons and particle size from 105 to 115 nanometers.

Preparation of Paint

Example P1

A paint was made based on polymer, Pol 1 and oligomer Olig 1, using the following process.

Stage 1 Millbase Preparation

Water (9.96 g) was placed in a half liter metal container, followed by Rocima V189 (1.0 g), Orotan 681 (6.4 g), Tego Foamex 1488 (1.2 g), Methyl Di-propoxal (13.16 g), Texanol (6.85 g), and Empimin OT75 (0.40 g). This was stirred at 500 rpm for approximately 5 minutes using a high speed disperser fitted with a Cowles blade. Tioxide TR52 (112.47 g) was added slowly to the vessel and the stirrer speed gradually increased to 2000 rpm. Acrysol RM 2020 (10.76 g) was then added to the vessel and the mixture stirred for 15 minutes at 2000 rpm.

Stage 2 Paint Make-Up

Polymer, Pol 1 (157.70 g) and oligomer, Olig 1 (171.30 g) were placed in a 1 liter metal container and stirred using a paddle stirrer at about 300 rpm. Ammonia solution (35% in water) was added drop-wise with stirring at about 400 rpm to bring the pH to between 7 and 8. Millbase from Stage 1 (162.20 g) was added to the container and stirred at the same speed. Propylene glycol (7.10 g) and water (11.60 g) were added and the mixture stirred for 10 minutes at about 700 rpm.

The viscosity of the paint was measured at 10000 $s^{-1}$ using an ICI cone and plate viscometer (available from REL Ltd, Middlesex, UK) at room temperature and was found to be 0.3 Pa·s Further Paints Further paints, P2-P25 were made following the process and recipe of P1 but replacing the polymer and oligomer with the variants, and in the ratio indicated.

| Paint | Oligomer | Polymer | Ratio (Olig:Pol) |
|---|---|---|---|
| P2 | Olig 1 | Pol 2 | 1:1 |
| P3 | Olig 1 | Pol 3 | 1:1 |
| P4 | Olig 1 | Pol 4 | 1:1 |
| P5 | Olig 1 | Pol 5 | 1:1 |
| P6 | Olig 1 | Pol 6 | 1:1 |
| P7 | Olig 1 | Pol 7 | 1:1 |
| P8 | Olig 1 | Pol 8 | 1:1 |
| P9 | Olig 1 | Pol 9 | 1:1 |
| P10 | Olig 2 | Pol 1 | 1:1 |
| P11 | Olig 3 | Pol 1 | 1:1 |
| P12 | Olig 4 | Pol 1 | 1:1 |
| P13 | Olig 5 | Pol 1 | 1:1 |
| P14 | Olig 6 | Pol 1 | 1:1 |
| P15 | Olig 7 | Pol 1 | 1:1 |
| P16 | Olig 8 | Pol 1 | 1:1 |
| P17 | Olig 9 | Pol 1 | 1:1 |
| P18 | Olig 10 | Pol 1 | 1:1 |
| P19 | Olig 1 | Pol 1 | 0:1 |
| P20 | Olig 1 | Pol 1 | 0.18:1 |
| P21 | Olig 1 | Pol 1 | 0.43:1 |
| P22 | Olig 1 | Pol 1 | 0.67:1 |
| P23 | Olig 1 | Pol 1 | 1:1 |
| P24 | Olig 1 | Pol 1 | 2.33:1 |
| P25 | Olig 1 | Pol 1 | 1:0 |

The ratio indicates the relative amount of oligomer to polymer based on the weight % solids content of the dispersions.

The cone and plate viscosity of all paints was measured and found to be from 0.15 to 0.30 Pa·s.

Comparative Example PA

The example referenced as Paint Example 4 in WO 03/082999A1 was repeated using the procedure and recipe on page 40, line 5 to 12, the contents of which are hereby incorporated by reference. Since no guidance is given in that document as to which pigment paste to use, the millbase of Stage 1, described above, was used.

Oligomer DA3 used in Paint Example 4 was prepared following the procedure and recipe bridging page 34, line 39 to page 35, line 5 to 18, the contents of which are hereby incorporated by reference. The oligomer dispersion had a weight solids content of 30.6%, the molecular weight of the oligomer was 17500 and the mean particle diameter was 115 nanometers.

Polymer P1 was prepared following the procedure and recipe on page 37, line 1 to 18, the contents of which are hereby incorporated by reference. The polymer dispersion had a weight solids content of 52.1% and the mean particle diameter was 419 nanometers. The molecular weight could not be measured as the polymer particles could not be dissolved in solvent, indicating that the polymer was of very high molecular weight.

The paint had a cone and plate viscosity of 0.18 Pa·s

Paints P1-P25 and PA were evaluated for gloss, open times, sand dry times hardness and stain removal according to the tests procedure described below. The test results are shown in Tables 1, 2 and 3.

Test Procedures

The following procedures were used to assess the performance of the paints.

Gloss

Gloss was measured by spreading a coat of the sample paint onto a glass panel using a 100 micron block spreader. This was allowed to dry at ambient temperature for a week and the gloss measured at 20° from normal using a Tri-Microgloss gloss meter. The gloss meter measures the amount of light reflected from the paint surface at the angle specified as a percentage of the amount of incident light.

Open Time

Open time was assessed using the method described in WO 03/082999 which is summarised below.

The wet paint sample to be tested was applied using a wire rod (K-bar 9) to a test chart (18×24 cm; Form 8B; available from Leneta Company) to give a wet paint film thickness of approximately 120 microns. The open time was determined by brushing at regular intervals a virgin 75 cm² area of the coated chart with a brush carrying more of the paint under test during 30 seconds. In this time the brush was moved in one set comprising 5 times in the direction of the width of the substrate and 5 times in the direction of length of the substrate. The wet paint was allowed to dry horizontally for 24 hours before visually assessing the coating. Once the composition carried on the brush no longer formed a homogeneous layer with the coating spread using the wire rod the open time was considered to be over.

Stain Resistance

A smooth fully opaque dried paint film is prepared. The dried paint sample is allowed to age for 24 hours at 18 to 25° C. prior to testing. Samples of Ribina (blackcurrant juice), coffee, tea, curry, DEB (a dyed industrial grade hand cleanser), red wine, oil, ketchup, pencil, crayon, shoe polish, toothpaste and mustard are applied to the dried paint film, and after 30 minutes wiped with a sponge. The wiped paint film is then rated from 1 to 4 according to the amount of stain remaining on the paint.
1) Stain completely removed
2) Slight stain left
3) Moderate stain left
4) Bad stain left The individual stain ratings are added up to give a figure for the total stain remaining on the paint for all the stains used and the result is expressed as a percentage of the total possible staining (that is, total number of stains used×4).

Sand-Dry Time (British Standard 3900 Part C2)

A sample of the wet paint is applied to a thoroughly cleaned glass panel using a 100 micron block spreader. A trail of sand (Double H Silver Sand from Tricentrol) is deposited on the surface of the film, at 20° C., from a hopper travelling over the film at the rate of 2.54 cm/hour. The hopper runs until the paint is dry to the touch or until the hopper has completely traversed the glass panel. The distance over which sand adheres to the paint film is measured and converted to the drying time in hours.

Hardness

The hardness of the dried paint film at 1 week was measured according to the DIN 53157 test.

Mean Particle Diameter

A dilute sample of the test sample was measured using a model Mastersizer 2000 particle size analyser.

Molecular Weight

A Waters 150CV fitted with 2×30 cm PLGel Mix D GPC columns operating at 35° C. at a flow rate of 1 ml/minute and using tetrahydrofuran as eluant. A sufficient amount of the polymer or oligomer dispersion was dissolved in THF to give a solids concentration of 1.0 mg/ml. The sample was left to dissolve for 4 hours. The solution was filtered through a 0.45 micron PTFE membrane prior to injection. 200 microliters of this was injected and into the column. The molecular weights quoted are weight average relative to polystyrene in THF Fox Tg The glass transition temperature $Tg^{AB\cdots}$ of the copolymer AB . . . is calculated according to the Fox equation $$1/Tg^{AB\cdots} = W^A/Tg^A + W^B/Tg^B \ldots$$

where $Tg^A$ and $Tg^B$ are the glass transition temperatures of the homopolymers of the component monomers A and B, in ° K., and $W^A$ and $W^B$ their weight fraction present.

Water Spot Test

The wet paint was drawn down on Leneta test charts (Form 2C) using a 100 micron block spreader. The films were dried at ambient temperature for 20 minutes and then at 50° C. for 16 hours. After they cooled down to ambient temperature the films were tested for water resistance by placing a 1 ml drop of water on the film and covering it with a watch glass. The water was removed after 4 hours and the damage to the coating was assessed.

Block Resistance

Two 7 cm×30.5 cm×1.8 cm British Columbian Pine wood panels were coated by brush with one coat of Dulux Trade Undercoat followed by two coats of the test paint, allowing 24 hours ambient temperature drying between each coat. After the final coat had dried for 24 hours at ambient temperature the two panels were placed on top of one another, so that the test paints were adjacent, and a 5 kg weight was placed on top of the panels. After 16 hours the weight was removed and the force required to separate the panels and the damage done to the paint was recorded. The performance was rated on the ease of separation of the two panels and the degree of damage done to the test paint.

Table 1 summarises the paint properties of paints P1-P9 and PA.

Table 2 summarises the paint properties of paints P10-P18.

Table 3 summarises the paint properties of paints P19-P25.

TABLE 1

| Paint | Gloss | Open time mins | Sand dry mins | Hardness seconds | Stains % remaining | Comment |
|---|---|---|---|---|---|---|
| P1 | 81 | 10 | 110 | 71 | 29 | |
| P2 | 85 | 6 | 120 | 71 | 38 | |
| P3 | 86 | 6 | 120 | — | 36 | Fails blocking test |
| P4 | 86 | 6 | 120 | — | 38 | Fails blocking test |
| P5 | 83 | 6 | 220 | 43 | 26 | Fails water spot |
| P6 | 83 | 6 | 170 | 47 | 28 | |
| P7 | 80 | 6 | 60 | 67 | 27 | Unacceptable appearance on recoat |
| P8 | 63 | 15 | 20 | 50 | 52 | |
| P9 | 60 | 12 | 35 | 53 | 52 | |
| PA | 43 | 18-20 | 660 | 10 | 70 | |
| | ≥75 | 6-10 | ≤200 | ≥30 | <55 | Minimum acceptable performance |

— means not available

TABLE 2

| Paint | Gloss % | Open time mins | Sand dry mins | Hardness seconds | Stains % remaining | Comment |
|---|---|---|---|---|---|---|
| P10 | 76 | 7 | 75 | 61 | 52 | |
| P11 | 77 | 8-10 | 53 | 77 | 52 | |
| P12 | 71 | 7 | 45 | 83 | 52 | |
| P13 | 69 | 8 | 30 | 88 | 50 | |
| P14 | 78 | 8-10 | 240 | 48 | 43 | |
| P15 | 78 | 8-10 | 120 | 58 | 48 | |
| P16 | 77 | 6-8 | 75 | 83 | 50 | |
| P17 | 79 | 6 | 45 | 89 | 45 | |
| P18 | 33 | 5-7 | 15 | 84 | 47 | |
| PA | 43 | 18-20 | 660 | 10 | 70 | |
| | ≥75 | 6-10 | ≤200 | ≥30 | <55 | Minimum acceptable performance |

TABLE 3

| Paint | Gloss % | Open time mins | Sand dry mins | Hardness seconds | Stains % remaining | Comments |
|---|---|---|---|---|---|---|
| P19 | 82 | 4 | 10 | 96 | 34 | |
| P20 | 79 | 4 | 10 | 96 | 36 | |
| P21 | 81 | 6 | 45 | 77 | 35 | |
| P22 | 81 | 6 | 50 | 77 | 38 | |
| P23 | 80 | 8 | 50 | 73 | 38 | |
| P24 | 78 | 10 | 75 | 48 | 52 | |
| P25 | 13 | 10 | 400 | 22 | 57 | |
| | ≥75 | 6-10 | ≤200 | ≥30 | <55 | Minimum acceptable performance |

Although PA, the example from WO 03/082999, has open times of about 20 minutes, it nevertheless has unacceptably poor properties in all other areas that consumers consider important. In particular the gloss is very low, in fact falling within the range expected of a silk paint rather than a gloss. Furthermore, the sand dry time is very long, remaining tacky to the touch and the hardness reveals that it remains soft, even when dry. Possibly, as a consequence of being so soft, it is difficult to remove stains.

Paints P1 to P4 show the effect of the molecular weight of the addition polymer on the properties of the dry paint. As can be seen paints P1 to P4 have acceptable open times of from 6 to 10 minutes and gloss values of 80 to 86%. However, the two paints based on polymers of molecular weight 53000 Daltons and below are both fail the blocking test and are thus unacceptable.

Paints P5 to P7 show the effect of Tg of the addition polymer on the properties of the dry paint. These paints all have acceptable open times and gloss. However, P5 based on the Tg 0° C. has unacceptably long sand-dry times and also fails the water spot test. P7, based on the Tg 40° C. polymer has unacceptably rough finish when a fully dried first coat is recoated with a second coat.

Paints P8 and P9 show the effect of mean particle diameter of the addition polymer particles on the properties of the dry paint. The gloss is unacceptably low at 179 nanometers and above. By interpolation the maximum diameter beyond which the gloss is below 75% is about 159 nanometers.

Paints P10 to P13 show the effect of weight average molecular weight of the addition oligomer on the properties of the dry paint. From the data in the table a molecular weight of about 15000 Daltons is estimated as the molecular weight of the oligomer that will result in a gloss of at least 75%.

Paints P14 to P18 show the effect of Tg of the addition oligomer on the properties of the dry paint. At Tg of 0° C. the paint has an unacceptably long tack-free time and at 50° C. and above the gloss is unacceptably low.

Paints 19 to 25 show the effect of varying the oligomer to polymer ratio on the properties of the dry paint. At the lowest proportion of oligomer of 0.18:1 (equivalent to 15.25% of the combined oligomer and polymer solids) the open time is unacceptably low, whereas at a ratio of 0.43:1 (30% oligomer) it is acceptable at 6 minutes. Interpolating between the two gives a ratio of 0.30:1 (23% oligomer) as the minimum ratio of oligomer required to produce acceptable properties. Similarly, the highest ratio is 2.70:1 (73% oligomer.
Further Paints
P26

To Example P1 was added 4% by weight of a blue tinter containing 42% by weight of pigment blue 15.3-a phthalocyanine.

Comparative Example PB

To Example PA was added 4% by weight of a blue tinter containing 42% by weight of pigment blue 15.3-a phthalocyanine blue pigment.

The gloss, hardness and sand-dry of P26 and PB were measured according to the procedures described above. The results are shown in Table 4.

TABLE 4

| Paint | Gloss % | Sand dry/mins | Hardness seconds | Comments |
|---|---|---|---|---|
| P26 | 71 | 45 | 93 | |
| PB | 37 | >600 | 16 | |

It is evident that the benefits of the invention are present in coloured paints as well as white paints.
P27

Example P1 was repeated other than that the thickener Acrysol RM 2020 was replaced with Borchigel L75N—the same thickener as used in the control paint. This produced a measured gloss in the dried paint of 83%.

Comparative Example PC

Comparative Example PA was repeated other than that the thickener, Borchigel L75N was replaced with Acrysol RM 2020—the same thickener as used in P1. This produced a measured gloss in the dried paint of 66.

Thus, the poor gloss of the prior art paints of WO 03/082999 is not due to the choice of thickener.
Effect of Viscosity on Open Time Example P1 was repeated but adjusted with varying amounts of Acrysol RM 2020 to produce Cone and Plate viscosities varying from 0.145 to 0.30 Pa·s. The open times of these paints ranged from 8 to 11 minutes.

The invention claimed is:

1. A pigmented, aqueous coating composition comprising i) an aqueous dispersion of non-crosslinkable addition oligomer of weight average molecular weight of from 5000 to 15000 Daltons and calculated Fox Tg greater than 0° C. and less than 50° C., ii) an aqueous dispersion of addition polymer of weight average molecular weight greater than 53,000 Daltons, calculated Fox Tg greater than 10° C. and less than 40° C. and mean particle diameter of less than 150 nanometers and the ratio of i):ii) is from 0.25:1 to 2.70:1 based on % weight dispersion solids, and iii) a pigment, and wherein the composition has an open time of from 6±1 to 12±3 minutes, and never more than 15 minutes; and when dry has a gloss of at least 75%.

2. A coating composition according to claim 1 wherein the polymer and oligomer are derived from monomer mixtures selected from the group consisting of esters of (meth)acrylic acid, styrene and styrene derivatives.

3. A coating composition according to claim 2, wherein the oligomer further comprises (meth)acrylic acid.

4. A coating composition according to claim 1 wherein the oligomer further comprises (meth)acrylic acid.

5. A coating composition according to claim 4 wherein the oligomer has an acid value of from 25 to 55 mg KOH/g.

6. A coating composition according to claim 4 which also contains ingredients selected from the group consisting of pigments, fillers, waxes, extenders, rheological modifiers, dispersants, flow aids and biocides.

7. A coating composition according to claim 5 wherein the oligomer has a weight average molecular weight of from 7500 to 12500 Daltons.

8. A coating composition according to claim 7 wherein the oligomer is free of methoxypolyethylene glycol methacrylate.

9. A coating composition according to claim 8 which also contains ingredients selected from the group consisting of pigments, fillers, waxes, extenders, rheological modifiers, dispersants, flow aids and biocides.

10. A process of applying to a substrate a coating according to claim 9 and causing or allowing said coating to dry to form a solid layer with a gloss of at least 75%.

11. Method of using the polymer and oligomer in combination as defined in claim 1 by applying said combination to a substrate to provide a pigmented, aqueous coating composition which has an open time of from 6±1 to 12±3 minutes and never more than 15 minutes; and when dry has a measured gloss of at least 75%.

12. A method of making the addition oligomer of claim 1 comprising the steps of making a monomer in water emulsion by i) mixing the monomers, water and surfactant and optionally hydrophobic material to form a mixture ii) exposing the mixture of i) to high shear mixing to form a monomer in water emulsion and causing the monomers to polymerise and form the addition oligomer dispersion.

13. A coating composition according to claim 1 wherein the oligomer has an acid value of from 25 to 55 mg KOH/g.

14. A coating composition according to claim 1 wherein the oligomer has a weight average molecular weight of from 7500 to 12500 Daltons.

15. A coating composition according to claim 1 wherein the oligomer is free of methoxy polyethylene glycol methacrylate.

16. A coating composition according to claim 1 which also contains ingredients selected from the group consisting of pigments, tillers, waxes, extenders, rheological modifiers, dispersants, flow aids and biocides.

17. A process of applying to a substrate a coating according to claim 1 and causing or allowing said coating to dry to form a solid layer with a gloss of at least 75%.

* * * * *

UNITED STATES PATENT AND TRADEMARK OFFICE
CERTIFICATE OF CORRECTION

PATENT NO.        : 8,197,902 B2
APPLICATION NO.   : 11/815093
DATED             : June 12, 2012
INVENTOR(S)       : Philip Louis Taylor et al.

It is certified that error appears in the above-identified patent and that said Letters Patent is hereby corrected as shown below:

In claim 16, column 18, line 58, change "tillers" to "fillers".

Signed and Sealed this
Thirty-first Day of July, 2012

David J. Kappos
*Director of the United States Patent and Trademark Office*